W. F. GIBSON.
TRAMCAR.
APPLICATION FILED APR. 8, 1920.

1,355,466.

Patented Oct. 12, 1920.

INVENTOR.
W. F. Gibson.
By N. E. Dunlap,
ATTORNEY.

UNITED STATES PATENT OFFICE.

WILLIAM FORD GIBSON, OF WYTHEVILLE, VIRGINIA.

TRAMCAR.

1,355,466.	Specification of Letters Patent.	Patented Oct. 12, 1920.

Application filed April 8, 1920. Serial No. 372,139.

*To all whom it may concern:*

Be it known that I, WILLIAM FORD GIBSON, a citizen of the United States of America, and resident of Wytheville, county of Wythe, and State of Virginia, have invented certain new and useful Improvements in Tramcars, of which the following is a specification.

This invention relates to cars or trucks for tramways and the like, and it has for its chief object to provide a tram car, designed primarily for use on temporary or cheaply constructed trackways, as logging roads and other non-permanent railways, which does not require the employment of carefully-laid track-rails nor that a regular or even gage be maintained between the track-rails.

As heretofore commonly constructed, each of the wheels of such trucks or cars carries an inner peripheral flange which serves to guide the wheel with respect to the inner edge of the track-rail upon which it travels. Such construction permits but little relative deviation of the track-rails without producing derailment of cars passing thereover. Slight deviation in the gage of the track is in a measure provided for in some cases by mounting the wheels on the car axle in such manner that they are freely shiftable on the axle throughout a short distance, as from two to four inches; but this expedient is objectionable, firstly, because it does not compensate for greater deviations from the regulation track gage—that is, deviations resulting from the shifting of rails throughout materially greater distances than that of which the wheels are capable—and, secondly, because it is difficult, if not impossible, to provide durable brakes which will operate efficiently upon such shiftable wheels.

An object of the present invention is to obviate the objectionable features of previous structures by the provision of a tram car having wheels which are non-shiftable and which are constructed to allow for relatively wide deviations of the track-rails in either direction from the regulation gage.

A still further object is to provide a car in which the wheels at one side thereof alone perform the function of guiding and maintaining the car on the track, and which, therefore, requires that particular regard to material and alinement be given alone to the rails traversed by said wheels.

Another object within the contemplation of the invention is to provide a tram car which will operate with full efficiency upon a trackway having the rails thereof laid directly upon the ground instead of upon crossties or other specially prepared foundation, which permits the rail at one side of the trackway to be composed of alined lengths of cheap or refuse material, such as flitches, scraps and like odds and ends of lumber of varying or uneven widths, and which has a construction which permits of the employment of rough, inexpensive, frogless forms of switches at switching points.

With these and other objects in view, the invention resides in the features of construction and arrangement which will hereinafter be fully described, reference being had to the accompanying drawings, in which—

Figure 1:
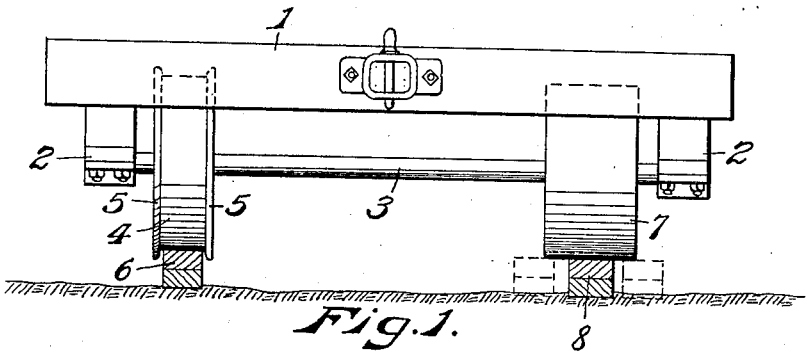
Figure 1 is an end elevation of a tram car embodying my invention, and—

Referring to said drawings, 1 indicates the frame or body of a tram car of a character adapted as a logging truck, the same having suitable bearings or journals 2 in which are rotatably mounted the opposite ends of the axles, as 3. Fixed to each of the axles 3 at one side is a wheel 4 of the double-flanged type, the opposite flanges 5 of which are designed to more or less closely engage the opposite lateral edges of the tread portion of the track-rail 6 upon which the wheel 4 travels, whereby said wheel is maintained in tracking relation to said rail.

Fixed upon the axle at the side opposite that which carries the wheel 4 is a wheel 7 having a plain unflanged peripheral, or tread, surface of a width relatively much greater than that of said wheel 4 and much greater than that which would be necessary were the regulation gage of the trackway at all times maintained. Said wheel 7 obviously performs no part in guiding the car with respect to the track-rails, this function being possessed alone by the wheel 4, but is adapted to travel upon a track-rail 8 composed of any character of material which provides a reasonably flat or even surface, and is adapted to function equally well when sections of material of wide, narrow, or irregular widths are employed in the construction of said rail as when sections of even and regular size are used. Further, the great width of the tread surface of said wheel makes allowance for lateral shifting of the rail 8 throughout a relatively great distance in either direction from the position in which said rail is initially laid, as is shown in dotted lines in Fig. 1.

Figure 2:
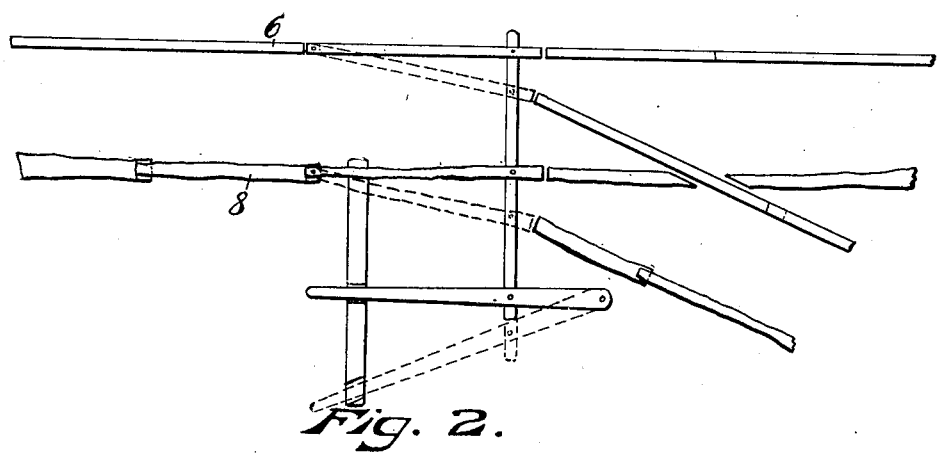
Fig. 2 is a plan view of a portion of trackway, including a switch, illustrating the character of trackway and switch to which the invention adapts itself.

As shown in Fig. 2, which illustrates a section of trackway at a switch, the track-rail 6 upon which the wheels 4 travel need alone be laid of material of even width, and special regard need be given alone thereto for maintaining proper alinement of rail sections. Both track-rails may be made of over-lapping slabs laid directly upon the ground, as shown in Fig. 1.

What is claimed is—

1. A tram car comprising axles, and wheels mounted on said axles, the wheels at one side being double flanged for guiding the car with respect to the trackway, and the wheels at the opposite side being unflanged and having tread surfaces of relatively great width.

2. A tram car comprising a frame, bearings carried by said frame, axles journaled in said bearings, and wheels fixed upon said axles adjacent to their opposite ends, the wheels at one side being double flanged for guiding the car with respect to the trackway, and the wheels at the opposite side having plain unflanged tread surfaces of relatively great width to permit of wide deviations of the track-rail upon which it travels from its regular or normal position.

3. A tram car comprising axles, double flanged wheels fixed on the axles at one side of the car for traveling upon a guide rail of the trackway and for guiding the car with respect to the latter, and unflanged wheels fixed on said axles at the other side of the car, said unflanged wheels having tread surfaces of inordinately great width adapted for travel upon track rails composed of uneven or irregular sections and to allow for wide deviations from the regulation gage of the trackway, said unflanged wheels being also designed to be supported by such rail when less than the full width of the tread surface of the latter is surmounted thereby.

In testimony whereof I affix my signature in presence of two subscribing witnesses.

WILLIAM FORD GIBSON.

Witnesses:
G. LEE TRINKLE,
W. S. TRINKLE.